United States Patent [19]

Aoki

[11] Patent Number: 4,697,760
[45] Date of Patent: Oct. 6, 1987

[54] CLUTCH MECHANISM FOR USE IN FISHING REELS

[75] Inventor: Atsuhito Aoki, Fuchu, Japan

[73] Assignee: Ryobi Limited, Hiroshima, Japan

[21] Appl. No.: 820,566

[22] Filed: Jan. 21, 1986

[30] Foreign Application Priority Data

Jan. 21, 1985 [JP] Japan .............................. 60-7029[U]

[51] Int. Cl.$^4$ ......................................... A01K 89/015
[52] U.S. Cl. ................................ 242/220; 192/93 A
[58] Field of Search ............... 242/212, 218, 219, 220, 242/221; 192/67 R, 93 R, 93 C

[56] References Cited

U.S. PATENT DOCUMENTS

| 4,281,808 | 8/1981 | Noda | 242/220 |
| 4,379,530 | 4/1983 | Kobayashi | 242/220 |
| 4,406,427 | 9/1983 | Murakami | 242/220 |
| 4,585,188 | 4/1986 | Sato et al. | 242/221 |
| 4,593,869 | 6/1986 | Yasui et al. | 242/220 |

Primary Examiner—Billy S. Taylor
Attorney, Agent, or Firm—Frishauf, Holtz, Goodman & Woodward

[57] ABSTRACT

A clutch mechanism for use in a fishing reel of the type wherein a pinion is operated by a clutch cam and a clutch lever, and a spool shaft is operated by a handle is disclosed. The mechanism comprises contact means provided for the clutch cam and operating means interposed between the clutch cam and a ratchet wheel. The operating means is spring-biased in a direction to mesh with the ratchet wheel, but is held by the contact means to disengaged from the ratchet wheel when the clutch cam is at its ON state. The operating means is released from the contact means and engages with the ratchet wheel when the clutch cam is turned to its OFF state, whereas, when the clutch cam is at its OFF state, the operating member pushes the contact means upon the forward rotation of the ratchet wheel to return the clutch cam to its ON state.

8 Claims, 12 Drawing Figures

CLUTCH MECHANISM FOR USE IN FISHING REELS

BACKGROUND OF THE INVENTION

This invention relates to a clutch mechanism for use in a fishing reel, and more particularly a clutch mechanism capable of transmitting and interrupting torque between a line winding spool supported by two bearings and a handle for rotating the spool and can be automatically switched from a torque interrupting state to a torque transmitting state when the handle is rotated in the forward direction, that is in a direction for taking up the line.

A prior art clutch mechanism for use in a fishing reel was constituted by a main gear rotated by a handle, a pinion meshing with the main gear and rotatably and axially slidably-fitted on a spool shaft so that when the pinion engages a notch of the spool shaft the pinion can rotate together with the spool shaft, a clutch bar for axially sliding the pinion, and a clutch cam connected to an operating lever and disposed between the clutch lever and a supporting plate so that when the coupling between the pinion and the spool shaft is released by the clutch cam, the pinion is coupled with the spool shaft through a ratchet wheel.

This clutch mechanism, however, is constructed such that when the clutch is switched to an OFF state, the end of a kick pawl is forced into a space between adjacent teeth of the ratchet wheel, so that depending upon the position of a ratchet tooth, the tooth collides against the kick pawl thus making it impossible to attain meshing of the ratchet wheel and the kick pawl. Consequently, the clutch operation is rendered inoperative, or a large force is necessary to engage the kick pawl against the ratchet wheel, the click feeling becomes small when both are engaged, the engaging tone is small with the result that the clutch OFF operation becomes inaccurate.

SUMMARY OF THE INVENTION

Accordingly, it is an object of this invention to provide an improved clutch mechanism for use in a fishing reel capable of smoothly effecting clutch OFF switching operation and accurately informing to the user of the reel switching to the clutch OFF state by feeling and tone.

According to this invention, there is provided a clutch mechanism for use in a fishing reel of the type wherein a pinion is operated by a clutch cam and a clutch lever, and a handle is connected to and disconnected from a spool shaft by engaging and disengaging the pinion from a notch of a spool shaft acting as a sliding shaft of said pinion, the improvement which comprises a spring for selectively urging said clutch cam to rotate in forward and reverse directions, contact means provided for said clutch cam, a ratchet wheel rotated by said handle, operating means interposed between said clutch cam and said ratchet wheel, said operating means being held by said contact means to be disengaged from said ratchet wheel when said clutch cam is at its ON state, and a spring for urging said operating means in a direction to engage said ratchet wheel, said operating means being released from said contact means and engaging said ratchet wheel when said clutch cam is turned to its OFF state, whereas, when said clutch cam is at its OFF state, said operating means pushes said contact means upon the forward rotation of said ratchet wheel to return said clutch cam to its ON state.

DESCRIPTION OF THE PREFERRED EMBODIMENTS

Figure 1:
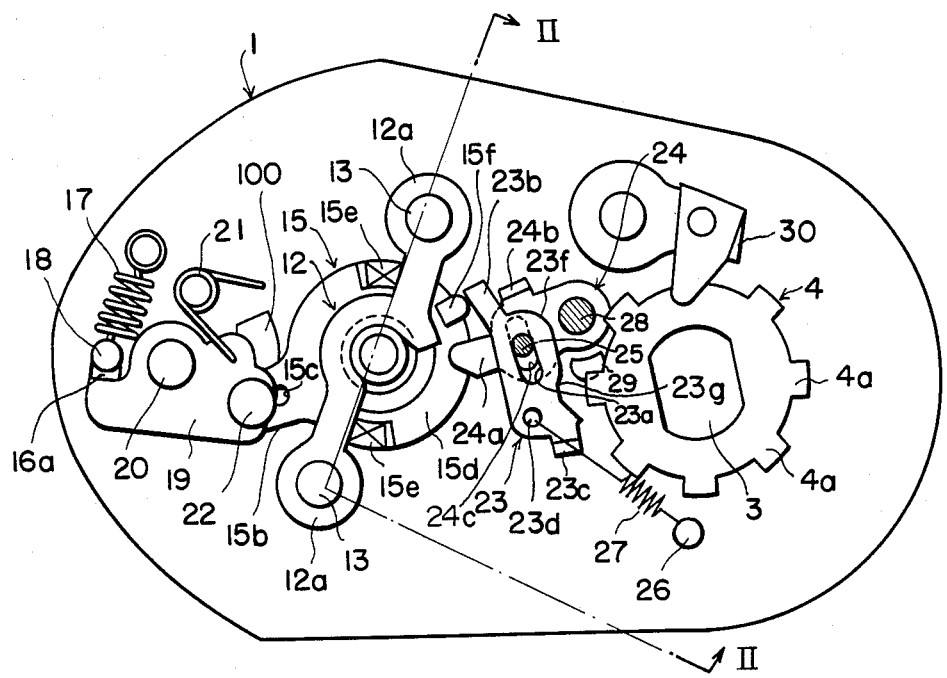
FIG. 1 is a front view of one embodiment of the clutch mechanism for use in a fishing reel according to this invention, in a clutch ON state.
Figure 2:
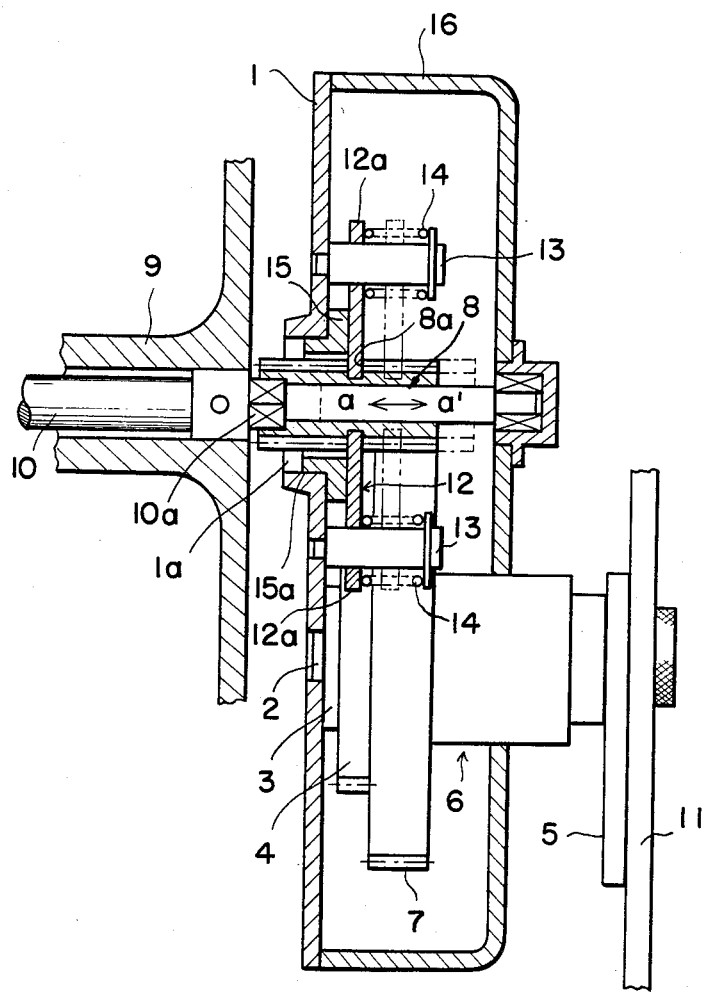
FIG. 2 is a sectional view of the clutch mechanism taken along a line II—II in FIG. 1.

In one embodiment, shown in FIGS. 1 through 6, the clutch mechanism comprises an inner side plate 1, a ratchet wheel 4 mounted on a handle shaft 3 supported by the side plate 1 through a shaft 2 (see FIG. 2), a drag star handle 5 threaded to the handle shaft 3, a main gear 7 disposed between the ratchet wheel 4 and the drag star handle 5 through a drag mechanism 6, and a pinion 8 meshing with the main gear 7 and mounted on a spool shaft 10 to be slidable in the axial direction shown by arrows a and a' in FIG. 2. The pinion 8 is coupled with or released from a notch 10a provided for the spool shaft 10 to connect or disconnect the spool shaft 10 to and from a handle 11.

Furthermore, a clutch lever 12 is engaged in a groove 8a formed on the outer periphery of the pinion 8. Arms 12a symmetrically projecting from the clutch lever 12 are mounted on guide pins 13 secured to the inner side plate 1 to be slidable in the axial direction. Arms 12a are resiliently urged toward the side plate 1 by coil springs 14 surrounding the guide pins 13. A clutch cam 15 is interposed between the side plate 1 and the clutch lever 12. The central cylindrical portion 15a of the clutch cam 15 is fit in an opening 1a of the side plate 1 while permitting the free rotation of the clutch cam 15.

A push lever shaft 18 (see FIG. 1) pulled by a tension spring 17 is slidably fit in a slot 16a of the side plate 1. An interlocking lever 19 is rotatably secured to the side plate 1 by a stepped screw 20 or the like. One end of the interlocking lever 19 is urged to selectively swing in opposed directions by a torsion spring 21. One end of the lever 19 and the projection 15b of the clutch cam 15 are interconnected by a pin 22. The bottom end of the pin 22 extends into a slot 100 formed on the side plate 1 so as to limit the swinging rage of the pin 22. When the lever 19 is rotated in the counter-clockwise direction in FIG. 1 beyond the dead point of the spring 21 by manually operating the push lever shaft 18, the lever 19 and the clutch cam 15 would be automatically rotated by the spring 21 to the position shown in FIG. 3 and held at that position.

Figure 3:
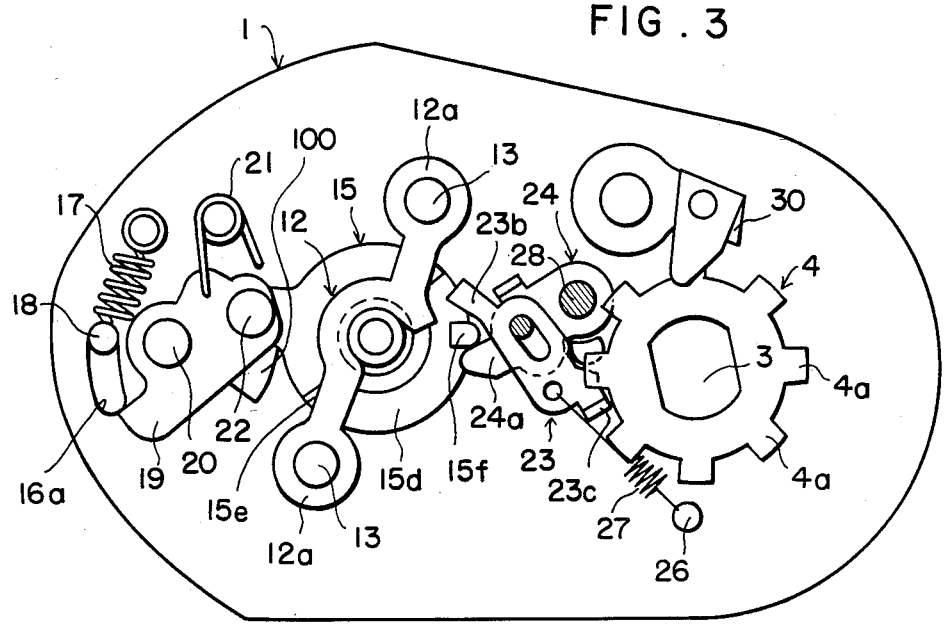
FIG. 3 is front view of the clutch mechanism shown in FIG. 1 but in a clutch OFF state.
Figure 6:
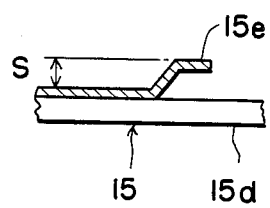
FIG. 6 is a longitudinal sectional view showing the cam member of the clutch cam utilized in the embodiment shown in FIG. 1.

As shown in FIG. 6, cam members 15e having a substantially larger displacement S than the coupling distance between the pinion 8 and the notch 10a of the spool shaft 10 are provided to the annular portion 15d of the clutch cam 15. When the clutch cam 15 is rotated in the clockwise direction in FIG. 1, the cam members 15e come to engage the clutch lever 12 so that the cam members 15e enter beneath arms 12a as shown in FIG. 3 by utilizing the inclined surfaces thereof, whereby the clutch lever 12 is moved by displacement S together with pinion 8 in the direction a' shown in FIG. 2 against the force of springs 14, thus disengaging the pinion 8 from the notch 10a of the spool shaft 10. Accordingly, the spool shaft 10 is disconnected from the handle 11 and the mechanism is shifted to its clutch OFF state. A projection 15f is provided on the surface of the annular portion 15d of the clutch cam 15.

Between the ratchet wheel 4 and the clutch cam 15, first and second operating levers 23 and 24 are disposed.

The first operating lever 23 has an elongated configuration, and a slot 23a is formed at about the center thereof. A contact member 23b is provided for the front end of the first operating lever 23 while an upwardly bent engaging member 23c is formed at the rear end. The first operating lever 23 is rotatably and slidably supported by a screw 25 extending through the slots 23a and secured to the inner plate 1 (see FIG. 5). Furthermore, the first operating lever 23 is biased to rotate in the counter-clockwise direction in FIG. 1 about the screw 25 by a spring 27 secured between a pin 23d provided on the first operating lever 23 and a pin 26 secured to the side plate 1. Consequently, the operating member 23b is urged against the projection 15f of the clutch cam 15 while the engaging member 23c is caused to disengage the ratchet wheel 4.

One side portion 23g of the first operating lever 23 is prepared to engage against a stopper 29 provided for the inner plate 1 for limiting the counter-clockwise rotation of the first operating lever.

The second operating lever 24 is disposed between the inner plate 1 and the first operating lever 23 and rotatably mounted on the side plate 1 by a screw 28 passing through the base portion of the operating lever 24. An operating member 24a is provided on the front end of the second operating lever 24. At one side of the upper portion of the operating lever 24, an upwardly bent engaging member 24b is formed to contact the operating member 23b of the first operating lever 23. A slot 24c is provided at about the center of the second operating lever 24 for receiving the screw 25 therein.

Figure 4:
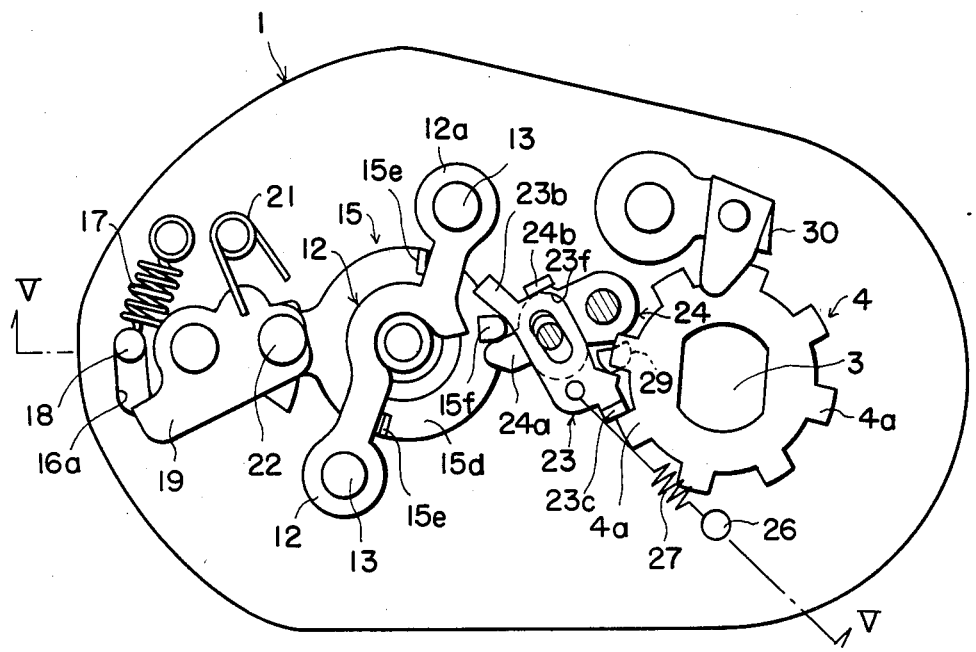
FIG. 4 is a front view of the clutch mechanism in an intermediate state to an ON state from an OFF state.
Figure 5:
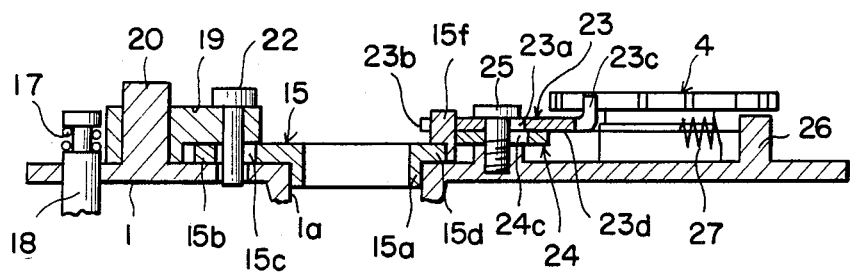
FIG. 5 is a sectional view taken along a line V—V in FIG. 4.

In FIGS. 1, 3 and 4, a reference numeral 30 designates a reverse rotation preventing pawl meshing with the ratchet wheel 4.

The above constructed mechanism operates as follows. In the state shown by solid lines in FIGS. 1 and 2, the mechanism is in the clutch ON state. When the clutch cam 15 is rotated in the clockwise direction by manually operating the push lever shaft 18, the pinion 8 is disengaged from the spool shaft 10 by the clutch lever 12 moved in the axial direction by cam members 15e so as to bring the clutch to the OFF state. At this time, the first operating lever 23 is rotated in the counter-clockwise direction until the side portion 23g engages the stopper 29 by the biasing force of the spring 27, so that the engaging member 23c will project between the adjacent teeth 4a of the ratchet wheel 4. Further, since the operating member 24a of the second operating lever 24 is being urged by the projection 15f, the second kick lever 24 would be rotated in the counterclockwise direction. Even when the engaging member 23c of the first operating lever 23 does not enter into a space between adjacent teeth 4a but stops at a position engaging a tooth 4a, the clutch cam 15 would not be influenced by the first operating lever 23 so that the clutch can be smoothly shifted.

To shift the clutch from the OFF state shown in FIG. 3 to the ON state shown in FIG. 1, the ratchet wheel 4 is to be forwardly rotated by the handle 11. With this rotation of the ratchet wheel 4, the engaging member 23c of the first operating lever 23 is pushed as shown in FIG. 4 by a tooth 4a of the ratchet wheel 4, to be moved upwardly and obliquely in FIG. 4 and the engaging member 24b of the second operating lever 24 comes to engage the shoulder 23f of the first operating lever 23, so that the second operating lever 24 is rotated in the clockwise direction about the screw 28. Even when the engaging member 23c has not been entered between adjacent teeth 4a, upon the rotation of the ratchet wheel 4 the engaging member 23c is caused to enter between the next adjacent teeth 4a and then pushed. Then, the operating member 24a pushes the projection 15f of the clutch cam 15 in the counter-clockwise direction whereby the clutch cam 15 is rotated in the counter-clockwise direction.

When the clutch cam 15 is rotated to a point beyond the dead point of the spring 21, the operating member 23b of the first operating lever 23 is urged by the projection 15f so that the first operating lever 23 is rotated in the clockwise direction against the force of the spring 27. As a consequence, the engaging merber 23c disengages from the ratchet wheel 4 and returns to the position shown in FIG. 1 by the biasing force of the spring 27. Further, the cam members 15e of the clutch cam 15 disengage from arms 12c of the clutch lever 12 so that the spring 14 causes the clutch lever 12 to return to the position shown by solid lines in FIG. 2 together with the pinion 8. Thus, the pinion 8 and the spool shaft 10 is again coupled and thereby bringing the clutch to the ON state.

Figure 7:
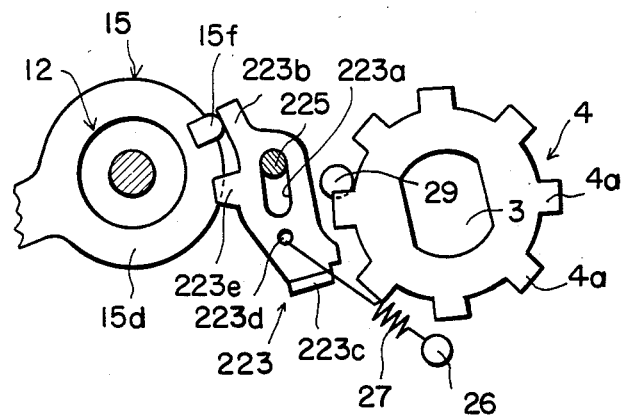
FIG. 7 is a front view showing a modified clutch mechanism in an ON state.
Figure 8:
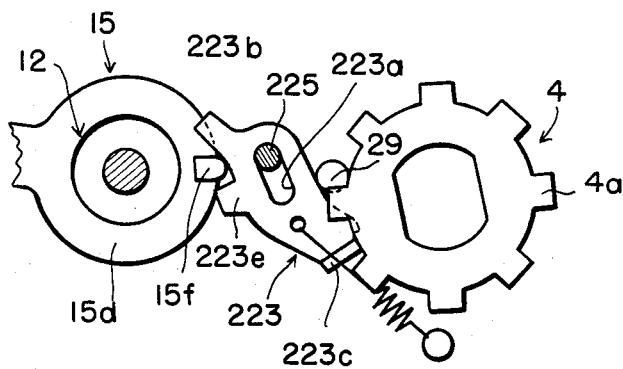
FIG. 8 is a front view of the modified clutch mechanism shown in FIG. 7 in an OFF state.
Figure 9:
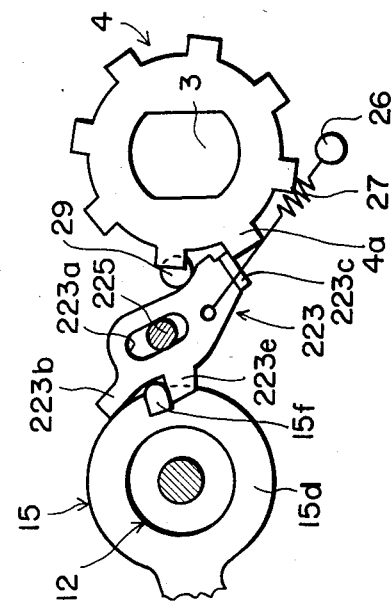
FIG. 9 is a front view of the clutch mechanism shown in FIG. 7 in an intermediate to the ON state from the OFF state.

FIGS. 7 through 9 show another embodiment of this invention. While in the first embodiment two operating levers were provided, in this modification, only one operating lever is used.

As shown in FIGS. 7 through 9, similar to the above described first operating lever 23, the operating lever 223 of this modification is rotatably and slidably secured to the inner plate 1 by a step screw 225 passing through a slot 223a at the center and resiliently urged to rotate in the counter-clockwise direction by a spring 27.

A contact member 223b is provided for one end of the operating lever 223 and an upwardly bent engaging member 223c is provided for the other end. An additional operating 223e which functions in the same manner as the second kick lever 24 of the first embodiment is projected from one side thereof so as to position the projection 15f of the clutch cam 15 between two members 223b and 223e.

When the clutch is ON, the first operating member 223b is pushed by the projection 15f of the clutch cam 15 so that the operating lever 223 is rotated in the clockwise direction as shown in FIG. 7 against the force of the spring 27 whereby its engaging member 223c is disengaged from the ratchet wheel 4. When the clutch is turned OFF by rotating the clutch cam 15, the projection 15f releases the pressure of the first operating member 223b so that the operating lever 223 is rotated in the counter-clockwise direction by the spring force as illustrated in FIG. 8.

Then, when the ratchet wheel 4 is rotated by the handle 11 for the purpose of switching the clutch to the ON state, the tooth 4a of the ratchet wheel 4 pushes the operating lever 23 upwardly and obliquely in FIG. 8. against the force of the spring 27 as shown in FIG. 9, whereby the operating member 223e pushes the projection 15f to rotate the clutch cam 15 to a position beyond the dead point of the spring 21. Thereafter, the spring 21 rotates the clutch cam 15 to the position shown in FIG. 7, thereby bringing the clutch to the ON state and the operating lever 223 returns to its original position by the biasing force of the spring 27.

Other parts and operations are the same as those of the previous embodiment.

Figure 11:
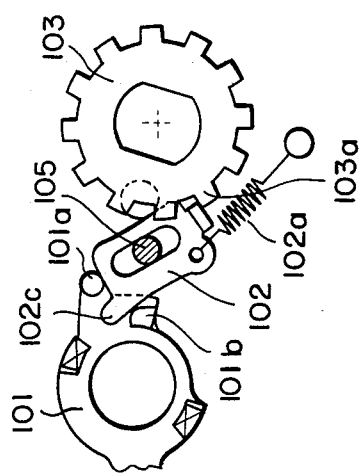
FIG. 11 is a front view of the clutch mechanism shown in FIG. 10 in an intermediate to the ON state from the OFF state.
Figure 12:
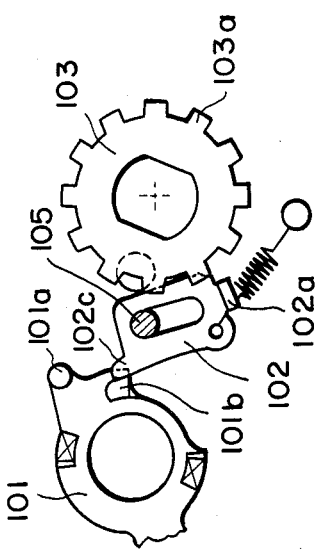
FIG. 12 is a front view of the modified clutch mechanism shown in FIG. 10 in an ON state.
Figure 10:
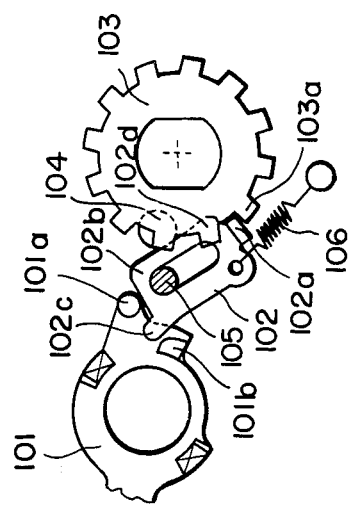
FIG. 10 is a front view showing a further modified clutch mechanism in an OFF state.

FIGS. 10 through 12 show still other embodiment of this invention. While in the second embodiment, the single projection 15f of the clutch cam 15 is positioned between the pair of contact members 223b and 223e, in this modification, a single contact member 102c formed on an operating lever 102 is, on the contrary, positioned between a pair of projections 101a and 101b provided on a clutch cam 101.

With this modified embodiment, in the clutch ON state shown in FIG. 12, the operating lever 102 is biased to rotate in the counter-clockwise direction by a spring 106 but its rotation is prevented by the projection 101b of the clutch cam 101. When the clutch cam 101 is rotated in the clockwise direction in FIG. 10 to bring the clutch to the OFF state, the projection 101b is moved and operating lever 102 is rotated in the counter-clockwise direction by the spring 106 until it engages a stopper 104, so that the contact member 102a enters into a space between the teeth 103a of a ratchet wheel 103 as shown in FIG. 10. Even when the member 102a collides upon a tooth 103a and does not enter into the space, it enters into the space upon the rotation of the ratchet wheel 103. When the ratchet wheel 103 is rotated in the clockwise direction in FIG. 10, a tooth 103a pushes the operating member 102a while the shoulder 102b pushes the projection 101a, so that the clutch cam 101 rotates in the counter-clockwise direction as shown in FIG. 11. When the clutch cam 101 passes through the dead point of the spring force and returns to the state shown in FIG. 12, the projection 101b of the clutch cam 101 pushes the contact member 102c of the operating lever 102 so that the contact member 102a disengages from the ratchet wheel 103 and returns to its original position shown in FIG. 12.

What is claimed is:

1. A clutch mechanism for use in a fishing reel comprising:
    a support;
    a spool shaft mounted on said support and connected to a spool on which fishing line is stored;
    a pinion movably coupled to said support and engageable with said spool shaft;
    operating means for, in an ON state, engaging said pinion with said spool shaft to drivingly couple a handle with said spool and for, in an OFF state, disengaging said pinion from said spool shaft to enable pay-out of the fishing line from said spool; said operating means comprising:
    (a) a clutch cam means including means for mounting the clutch cam means for rotation on said support, said clutch cam means having an ON state position and an OFF state position, wherein said clutch cam means moves the pinion between engagement and disengagement with the spool shaft as the clutch cam means rotates between its ON and OFF state positions, respectively, said clutch cam means including a contact portion;
    (b) a ratchet wheel rotatably mounted on said support and connected to said handle;
    (c) operating lever means including mounting means for mounting said operating lever means on said support for rotational and linear movement thereon and having a first position thereof engageable with said contact portion of the clutch cam means, and having a second portion thereof engageable with said ratchet wheel, said linear movement of the operating lever means being along a given line which is substantially tangent to a rotary locus of the clutch cam means and to a rotary locus of the ratchet wheel; and
    (d) spring means mounted on said support for biasing said operating lever means toward engagement with said ratchet wheel, the contact portion of the clutch cam means, in its ON state, urging the first portion of the operating lever means against the bias applied by said spring means to maintain the second portion of the operating lever means out of engagement with said ratchet wheel, the clutch cam means, upon being rotated from its ON to its OFF state position, enabling the spring means to move the operating lever means to bring the second portion of the operating lever means into position between adjoining teeth of the ratchet wheel; and
    motion transmitting means on the clutch cam means and the operating lever means responsive to force applied by a ratchet wheel tooth to the second portion of the operating lever means, upon rotation of the ratchet wheel by the handle in a direction to wind the fishing line onto the spool, for converting motion of said operating lever means along said given line into rotation of the clutch cam means from its OFF to its ON state position and, with such rotation of the clutch cam means, rotating the operating lever means to disengage the second portion of the operating lever means from said ratchet wheel as the contact portion of the clutch cam means urges the first portion of the operating lever means against the bias applied by the spring means.

2. The clutch mechanism of claim 1, wherein said contact portion of the clutch cam means comprises a projection formed on said clutch cam means, and the first portion of said operating lever means and the motion transmitting means on said operating lever means comprises a pair of contact members with said projection positioned therebetween, and wherein said projection bears against one of said contact members to maintain said operating lever means in disengagement from said ratchet wheel when said clutch cam means is at its ON state position, while the other one of said contact members bears against said projection to urge said clutch cam means to its ON state position upon the rotation of said ratchet wheel when said clutch cam means is at its OFF state position.

3. The clutch mechanism of claim 2 wherein said operating lever means comprises a pair of interconnected levers, each of which being provided with one of said pair of contact members at one end thereof.

4. The clutch mechanism of claim 2 wherein said operating lever means comprises a lever provided with said pair of contact members at one end thereof.

5. The clutch mechanism of claim 1, wherein said contact portion of the clutch cam means and the motion transmitting means on the clutch cam means comprise a pair of projections formed on said clutch cam means, and the first portion of said operating lever means being positioned between said projections, and wherein one of said projections bears against said first portion to maintain said operating lever means in disengagement from said ratchet wheel when said clutch cam means is at its ON state position while the other one of said projections bears against said first portion to return said clutch cam means to its ON state position upon rotation of said ratchet wheel when said clutch cam means is at its OFF state position.

6. The clutch mechanism of claim 1 wherein said mounting means comprises a guide pin connected to said support, and a slot for accommodating said guide pin therein.

7. The clutch mechanism of claim 3, wherein one of said pair of interconnected levers includes the one of said pair of contact members at said one end thereof and a lever mounting means at another end thereof, and a guide pin fixed to said one lever between the one contact member and the lever mounting means, said lever mounting means coupling the one lever to the support for rotation such that the given line is tangential to a locus of points of the guide pin;

the other of said pair of interconnected levers having a slot accommodating said guide pin therein, said second portion being provided at another end of the other lever opposite to said one end thereof on which the other of said pair of contact members is provided, and said spring means is connected to said other lever;

said motion transmitting means comprising opposed surfaces on the interconnected levers bearing against each other when the second portion on the other lever is positioned between adjoining teeth of the ratchet wheel, and a first surface on the projection of the cam means engaging the contact member at one end of the one lever with said first surface being opposed to another surface of the projection of the cam means engaging the contact member on the one end of the other lever.

8. The clutch mechanism of claim 4, wherein said mounting means comprises a pin connected to said support and a slot in said lever accommodating said pin therein.

* * * * *